United States Patent Office 2,873,255
Patented Feb. 10, 1959

2,873,255

ALKYL ESTERS OF ALKOXY-ACYLOXY STEARIC ACID

Lyle E. Gast, John C. Cowan, and Howard M. Teeter, Peoria, Ill., assignors to the United States of America as represented by the Secretary of Agriculture No Drawing. Application November 25, 1955
Serial No. 549,205

12 Claims. (Cl. 252—56)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This application is a continuation-in-part of our prior application Serial No. 375,081, filed August 18, 1953.

This invention relates to new chemical compounds, namely, alkyl esters of stearic acid wherein the stearic acid nucleus contains an alkoxy substituent and an acyloxy substituent. It relates further to novel lubricating compositions comprising our novel chemical compounds, which possess low pour points and other advantageous characteristics as lubricants. The invention also includes processes wherein the said compounds are employed as lubricants. Further aspects of the invention will be evident from the following description.

The novel compounds have the following general formula:

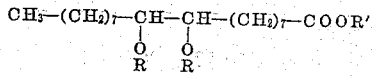

in which R' is an alkyl group of 1 to 8 carbon atoms, and the other R is an acyl group of a lower aliphatic carboxylic acid.

The foregoing compounds possess exceedingly low pour points, falling generally below −50° F., and possess viscosities at 100° F. ranging generally from 15 to 30 centistokes and at 210° F. from 3 to 5 centistokes. The A. S. T. M. slopes vary from about 0.720 to about 0.780.

The new compounds may be prepared in a variety of ways, but we prefer to start with 9.10 epoxystearic acid, first preparing the alkyl alkoxyhydroxystearate, as for example by the method of Swern, Billen and Scanlan, J. Am. Chem. Soc., 70, 1226 (1948). The method will be illustrated in the examples which follow. The washed and dried alkyl alkoxyhydroxystearate is then esterified with the appropriate acylation agent.

The method of Swern, Billen and Scanlan produces a compound in which the alkoxy (R) group is the same as the R' group. The method may be modified or further extended by saponifying the alkyl alkoxyhydroxystearate and reesterifying to place a different alkyl group in the position of R' in the structural formula. By following these procedures outlined above and in the following examples, we may produce a compound in which the alkyl groups of the substituents R and R' are the same or different.

The following examples illustrates the invention.

EXAMPLE I

A mixture of 9,10 epoxystearic acid, methanol (4 ml. per g. of acid) and sulfuric acid (0.1 percent total charge) was heated for three hours on a steam bath. The sulfuric acid in the final reaction mixture was exactly neutralized with sodium hydroxide solution and excess methanol distilled at 30–40 mm. pressure. The product, methyl methoxyhydroxy stearate, was washed with water and dried. It was then dissolved in acetone (3 ml./g. of product), and the solution cooled to −20° C. and filtered to remove any alkyl dihydroxystearate that might have formed. Acetone was then removed by disdistillation, and the product was esterified by the procedure of Example III below.

EXAMPLE II

The epoxy stearic acid in the foregoing example may be replaced by epoxidized soybean fatty acids, prepared by the method of Swern, J. Am. Chem. Soc., 67, 412 (1945). As an example, soybean fatty acids (neut. equiv. 283, iodine value 142) were epoxidized according to Swern with peracetic acid to yield an epoxidized product with neut. equiv. 339, iodine value 20; epoxy oxygen 4.0 percent. This product was treated with absolute methanol and sulfuric acid in accordance with Example I, to produce the methyl methoxyhydroxy derivative consisting essentially of the stearate; $OCH_3$, 14.93 percent.

EXAMPLE III

A mixture of methyl methoxyhydroxy stearate, prepared in Example I (1 mole), propionic anhydride (14.7 moles) and propionyl chloride (0.35 mole) was heated on the steam bath for three hours. At the end of the reaction, excess propionating agents were distilled off at reduced pressure and the product was washed with water, washed again with sodium bicarbonate solution, and finally with water. The properties of the product, methyl, methoxypropionoxy stearate are found in the table.

In a manner similar to the above, other alkyl or alkyl-acyl groups may be placed in the positions indicated in the general formula above. For example, the methyl methoxy hydroxy stearate used in Example III may be substituted by isopropyl methoxyhydroxy stearate, and then propionated as in the example.

It is to be understood that the specific methods of acylation discussed above are not intended to be limiting on this invention, but are described herein only for the purposes of illustration.

A number of representative compounds were prepared in accordance with the foregoing examples, and their properties are tabulated below.

The terms "high melting" and "low melting" 9,10-dihydroxystearic acid refer to two distinct diastereoisomeric mixtures of 9,10-dihydroxystearic acids. The "high melting" form is sometimes referred to as the "erythro" form, and the "low melting" form may similarly be called the "threo" form. In high-melting 9,10-dihydroxystearic acid the two hydroxyl groups have the same spatial configuration as the two central hydroxyl groups in the four-carbon-atom sugar, erythrose. The low-melting 9,10-dihydroxy stearic acid is similarly related to the sugar threose.

The term 9(10), 12(13)-dihydroxy stearic acid refers to a mixture of dihydroxystearic acids derived from linoleic acid. This mixture contains 9,12-, 9,13-, 10,12-, and 10,13-dihydroxystearic acids, but the proportion in which each is present in the mixture is not known.

*Table I*

DERIVATIVES OF ALKYL 9(10), 10(9) DIHYDROXYSTEARATES

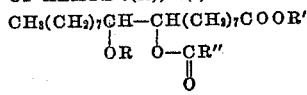

| Ex. No. | R | R'' | R' | $n_D^{30}$ | $d_4^{30}$ | Acid No. | Carbon Calcd. | Carbon Found | Hydrogen Calcd. | Hydrogen Found |
|---|---|---|---|---|---|---|---|---|---|---|
| 3 | $CH_3$ | $C_2H_5$ | $CH_3$ | 1.4446 | 0.9466 | <0.1 | 68.95 | 68.5 | 11.08 | 10.94 |
| 4 | $CH_3$ | $C_2H_5$ | Iso-$C_3H_7$ | 1.4426 | 0.9250 | 0.8 | 70.05 | 70.0 | 11.28 | 11.27 |
| 5 | $CH_3$ | $C_2H_5$ | n-$C_4H_9$ | 1.4450 | 0.9273 | 1.5 | 70.57 | 70.2 | 11.38 | 11.44 |
| 6 | $CH_3$ | $C_2H_5$ | Iso-$C_4H_9$ | 1.4443 | 0.9262 | <0.1 | 70.57 | 70.4 | 11.38 | 11.33 |
| 7 | $CH_3$ | $C_2H_5$ | 2-Ethylhexyl | 1.4481 | 0.9205 | 1.9 | 72.25 | 72.1 | 11.72 | 11.58 |
| 8 | $C_2H_5$ | $C_2H_5$ | $C_2H_5$ | 1.4430 | 0.9275 | <0.1 | 70.05 | 69.9 | 11.29 | 11.20 |
| 9 | $C_2H_5$ | $CH_3$ | $C_2H_5$ | 1.4431 | 0.9292 | 0.8 | 69.52 | 69.4 | 11.18 | 11.12 |
| 10 | n-$C_3H_7$ | $C_2H_5$ | n-$C_3H_7$ | 1.4441 | 0.9193 | <0.1 | 71.00 | 70.9 | 11.48 | 11.39 |
| 11 | n-$C_3H_7$ | $CH_3$ | n-$C_3H_7$ | 1.4440 | 0.9230 | 0.7 | 70.55 | 70.5 | 11.38 | 11.32 |
| 12 | Methoxyacetoxy [b] | | | 1.4520 | 0.9683 | 0.5 | | | | |
| 13 | Methoxypropionoxy [b] | | | 1.4530 | 0.9681 | 0.8 | | | | |

| Ex. No. | Sap. Equiv. Calcd. | Sap. Equiv. Found | Molecular Refractivity Calcd. | Molecular Refractivity Found | Vis. Index | ASTM Slope | Pour Point, °F. | Viscosity, Cs. at °F. 100 | Viscosity, Cs. at °F. 210 | Distillation Data Press., Microns | Distillation Data Temp., °C. |
|---|---|---|---|---|---|---|---|---|---|---|---|
| 3 | 200.4 | 199 | 113.4 | 112.6 | 86.5 | 0.780 | <−70 | 15.05 | 3.25 | 3 | 110 |
| 4 | 214.3 | 215 | 122.6 | 122.7 | 100.2 | 0.763 | −26 | 17.02 | 3.60 | 3 | 105 |
| 5 | 221.3 | 222 | 127.3 | 127.1 | 123.9 | 0.740 | −69 | 17.52 | 3.81 | 3 | 115 |
| 6 | 221.3 | 216 | 127.3 | 127.0 | 115.3 | 0.750 | −64 | 19.58 | 4.00 | 3 | 113 |
| 7 | 249.9 | 244 | 145.7 | 145.4 | 125.0 | 0.730 | −64 | 25.06 | 4.78 | 3 | 135 |
| 8 | 214.3 | 208 | 122.6 | 122.5 | 110.8 | 0.756 | −68 | 15.83 | 3.48 | 3 | 105 |
| 9 | 207.3 | 206 | 118.3 | 118.0 | 89.5 | 0.788 | −65 | 17.52 | 3.57 | 3 | 88 |
| 10 | 228.3 | 220 | 131.9 | 132.0 | 124.8 | 0.742 | −71 | 18.09 | 3.89 | 3 | 105 |
| 11 | 221.3 | 218 | 127.3 | 127.3 | 102.0 | 0.768 | −70 | 20.34 | 3.98 | 3 | 100 |
| 12 | | 178 | | | 84.6 | 0.770 | −50 | 28.2 | 4.67 | (a) | |
| 13 | | 188 | | | 107.2 | 0.750 | −63 | 24.9 | 4.55 | (a) | |

[a] Not distilled.
[b] Derivative of methyl esters of soybean fatty acids.

We claim:

1. A compound having the following structural formula:

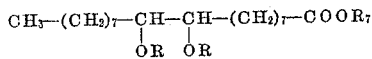

of which R' is an alkyl group of from 1 to 8 carbon atoms, one R is an alkyl radical of from 1 to 8 carbon atoms and the other R is an acyl group of a lower aliphatic carboxylic acid.

2. The compound of claim 1 in which R' is methyl, one R is methyl and the other R is propionyl.

3. The compound of claim 1 in which R' is propyl, one R is propionyl and the other R is propyl.

4. The compound of claim 1 in which R' is ethyl, one R is ethyl and the other R is propionyl.

5. The compound of claim 1 in which R' is propyl, one R is propyl, and the other R is acetyl.

6. The compound of claim 1 in which R' is ethyl, one R is ethyl and the other R is acetyl.

7. A process comprising lubricating parts with the compound of claim 1.

8. A process comprising lubricating parts with the compound of claim 2.

9. A process comprising lubricating parts with the compound of claim 3.

10. A process comprising lubricating parts with the compound of claim 4.

11. A process comprising lubricating parts with the compound of claim 5.

12. A process comprising lubricating parts with the compound of claim 6.

References Cited in the file of this patent

UNITED STATES PATENTS

| 2,332,849 | Gruber | Oct. 26, 1943 |
| 2,559,510 | Mikeska | July 3, 1951 |
| 2,652,411 | Teeter et al. | Sept. 15, 1953 |

OTHER REFERENCES

Chikamori: "Synthesis of Derivatives of Dihydroxy-Stearic Acid," J. Chem. Soc. Japan. Pure Chem. Sect. 72, pp. 747–8 (1951) (article in Japanese) (available at Army Medical Library, Washington, D. C.) (English abstract in Chem. Ab. 46, 11108g).

UNITED STATES PATENT OFFICE

CERTIFICATE OF CORRECTION

Patent No. 2,873,255                         February 10, 1959

Lyle E. Gast et al.

It is hereby certified that error appears in the printed specification of the above numbered patent requiring correction and that the said Letters Patent should read as corrected below.

Column 1, line 41, after "atoms," insert -- one R is an alkyl radical of from 1 to 8 carbon atoms --; column 3, line 43, right-hand portion of the formula, for "-COOR$_7$" read ---COOR' --.

Signed and sealed this 9th day of June 1959.

(SEAL)
Attest:

KARL H. AXLINE                                     ROBERT C. WATSON
Attesting Officer                                 Commissioner of Patents